United States Patent [19]
Lee

[11] Patent Number: 6,064,175
[45] Date of Patent: May 16, 2000

[54] SENSORLESS THREE-PHASE BRUSHLESS DC MOTOR DRIVE CIRCUIT

[75] Inventor: Young-Kyu Lee, Incheon-si, Rep. of Korea

[73] Assignee: Samsung Electronics, Co., Ltd., Suwon, Rep. of Korea

[21] Appl. No.: 09/139,952

[22] Filed: Aug. 25, 1998

[30] Foreign Application Priority Data

Aug. 25, 1997 [KR] Rep. of Korea ........................ 97-40599

[51] Int. Cl.[7] ........................................................ H02P 1/18
[52] U.S. Cl. ............................ 318/809; 318/254; 318/138; 318/439
[58] Field of Search ................................. 318/254, 439, 318/138, 809

[56] References Cited

U.S. PATENT DOCUMENTS

| 3,940,676 | 2/1976 | Dudley . | |
|---|---|---|---|
| 4,208,621 | 6/1980 | Hipkins et al. | 318/138 |
| 4,641,066 | 2/1987 | Nagata et al. | 318/254 |
| 4,651,069 | 3/1987 | Pellegrini | 318/254 |
| 4,694,210 | 9/1987 | Elliott et al. | 310/68 R |
| 4,916,370 | 4/1990 | Rowan et al. | 318/368 |
| 5,384,527 | 1/1995 | Rozman et al. | 322/10 |
| 5,629,598 | 5/1997 | Wilkerson | 318/808 |

*Primary Examiner*—Robert E. Nappi
*Assistant Examiner*—Rina I. Duda
*Attorney, Agent, or Firm*—Marger Johnson & McCollom, P.C.

[57] ABSTRACT

A drive circuit for a sensorless three-phase brushless DC motor provides improved drive characteristics by generating a pseudo back-electromotive signal in response to the voltages of the stator coils, and then using the pseudo back-electromotive signal to commutate the current through the stator coils before maximums in the back electromotive force, thereby providing smoother motor rotation. The drive circuit includes comparators for generating rectangular difference signals by comparing the voltages of the stator coils, an edge detector and control circuit for generating a pulse signal that is delayed from the difference signals, signal generators for generating a trapezoidal signal and three step signals responsive to the pulse signal, and an output control circuit for generating drive signals for a commutator drive circuit responsive to the trapezoidal step signals. By setting the voltage differences between the trapezoidal and step signals to values less than the Hall bias level, the drive signals can be made to change linearly, thereby providing soft switching of the transistor switches in the commutator drive circuit.

19 Claims, 2 Drawing Sheets

6,064,175

SENSORLESS THREE-PHASE BRUSHLESS DC MOTOR DRIVE CIRCUIT

This application corresponds to Korean patent application No. 97-40599 filed Aug. 25, 1997, in the name of Samsung Electronics Co., Ltd., which is herein incorporated by reference for all purposes.

BACKGROUND OF THE INVENTION

1. Field of the Invention

This invention relates generally to motor drive circuits, and more particularly, to drive circuits for sensorless three-phase brushless DC motors that does not require the use of Hall sensors.

2. Description of the Related Art

A typical three-phase brushless DC motor can has a rotor with permanent magnets and a stator with three coils: U-coil, V-coil, and W-coil. As shown in FIG. 1, the rotor includes a main magnet 10 for providing the necessary torque for motor rotation and a sub-magnet 12 for controlling motor speed. Both the main magnet 10 and sub-magnet 12 have repeatedly alternating North and South magnetic poles. The ratio of the magnetic poles on the main magnet to those on the sub-magnet is preferably 1 to 3.

Motor rotation in a three-phase brushless DC motor is produced by currents flowing through the coils which create a magnetic field which, in turn, generates a torque that causes the motor to rotate. In order to maintain the rotation in one direction, magnetic fields from the rotor are detected with Hall sensors, and then the direction of electric current flowing in each stator coil is changed based on the intensity of the detected magnetic fields. This changing of the direction of electric current flow is called commutation.

Three-phase brushless DC motors with three Hall sensors have been widely used to detect magnetic field intensity. Three Hall sensors are positioned in such a way to enable detection of magnetic fields of the main magnet 10 to generate Hall signals with 120-degree phase differences. Commutation of currents flowing in stator coils is performed by sequentially turning on or off drive transistors of an output drive circuit in response to the Hall signals.

Recently, three-phase brushless DC motors that use a single Hall sensor have been introduced. With this technique, a single Hall sensor, which is installed on the exterior of the motor, is used to detect the Hall signal of the sub-magnet 12 whose period is one-third that of the main magnet 10. The detected Hall signal from the sub-magnet 12 is used to produce three three-phase step voltage signals that have the same period as the Hall signal of the main magnet 10. Each Hall signal from the sub-magnet 12 is 120 and 240 degrees out of phase with the other two voltage signals. These three-phase step voltage signals and the Hall signal from the sub-magnet 12 are used together to perform commutation by sequentially switching the driving transistors in an output drive circuit. A technique relating to driving a motor using either one or three Hall sensors is described in Korean Patent Application No. 96-37803.

A technique of driving a motor without using any Hall sensors has been introduced because using even a single Hall sensor to drive a motor increases the motor system size and manufacturing costs. With this technique, sensorless motor drive circuits utilize back- electromotive force generated by the coils of the stator during motor rotation to drive the motor. The back-electromotive force is at maximum or minimum state at the point when a North and South magnetic pole boundary of the main magnet of the rotor is aligned with the center of a stator coil. The direction of electric current in the stator coil is reversed to perform commutation when the back-electromotive force is at a maximum or minimum state.

The sensorless motor driving circuits described above have several problems. One problem is that it is difficult to detect pure back-electromotive force due to currents flowing in the coils and the inherent resistance of the coils. Even if it is possible to detect pure back-electromotive force, another problem results since a hard switching method is used to turn the drive transistors on and off in an output drive circuit. This method may induce spikes during the switching process, which worsens electromagnetic interference. Therefore, the above-mentioned sensorless motor requires the use of snubbers to prevent spikes during the switching process.

Accordingly, a need remains for an improved scheme for driving a three-phase brushless DC motor.

SUMMARY OF THE INVENTION

Therefore, it is an object of the present invention to eliminate the need for a Hall sensor in a brushless DC motor drive circuit.

Another object of the present invention is to reduce electrical transients in a drive circuit for a brushless DC motor.

A further object of the present invention is to improve the drive characteristics of a drive circuit for a brushless DC motor.

Yet another object of the present invention is to improve the accuracy of a drive circuit for a brushless DC motor.

To accomplish these and other objects, a drive circuit for a sensorless three-phase brushless DC motor provides improved drive characteristics by generating a pseudo back-electromotive signal in response to the voltages of the stator coils, and then using the pseudo back-electromotive signal to commutate the current through the stator coils before maximums in the back electromotive force, thereby providing smoother motor rotation.

The drive circuit includes comparators for generating rectangular difference signals by comparing the voltages of the stator coils, an edge detector and control circuit for generating a pulse signal that is delayed from the difference signals, signal generators for generating a trapezoidal signal and three step signals responsive to the pulse signal, and an output control circuit for generating drive signals for a commutator drive circuit responsive to the trapezoidal step signals. By setting the voltage differences between the trapezoidal and step signals to values less than the Hall bias level, the drive signals can be made to change linearly, thereby providing soft switching of the transistor switches in the commutator drive circuit.

The present invention is directed to a sensorless three-phase brushless dc motor driving circuits that performs soft switching during the commutation process and does not rely upon the sensing of back-electromotive force.

An embodiment of a sensorless driving motor circuit according to the present invention detects voltage changes in the stator coils and compares them to back-electromotive force and timing signals to generate a pseudo-back electromotive signal which is substantially identical to the actual back-electromotive signal, rather than actually detecting back-electromotive force and generating a back-electromotive signal. This pseudo back-electromotive signal is used to perform commutation at points slightly before extreme points of the pseudo back-electromotive signal in order to obtain smoother motor rotation. The extreme points occur at points when a magnetic pole boundary of the permanent magnet is aligned with the center of a stator coil.

One aspect of the present invention is a drive circuit for a sensorless three-phase brushless DC motor, comprising: a comparator for comparing the voltages of stator coils during motor rotation and generating a rectangular difference signal; an edge detector coupled to the comparator for detecting edges of the rectangular difference signal and generating a first pulse signal; a timing circuit coupled to the edge detector for generating a second pulse signal responsive to the first pulse signal; a signal generator coupled to the timing control circuit for generating first, second and third step signals and a control signal responsive to the second pulse signal; and a commutator coupled to the signal generator for commutating the currents flowing in the stator coils responsive to the differences between the control signal and each of the step signals.

Another aspect of the present invention is a method for driving a sensorless three-phase brushless DC motor, the method comprising: generating a rectangular difference signal by comparing the voltages of stator coils during motor rotation; generating a first pulse signal responsive to edges of the rectangular difference signal; generating a second pulse signal by delaying the first pulse signal; generating first, second and third step signals responsive to the second pulse signal; generating a control signal responsive to the second pulse signal; and commutating currents flowing in the stator coils responsive to the difference between the control signal and each of the step signals.

In a preferred embodiment, the duty cycle of the second pulse signal is 50 percent; the control signal swings between an above-Hall bias voltage and a below-Hall bias voltage during each period of the second pulse signal; each step signal has a signal period which is three times the period of the second pulse signal; each step signal is 120 and 240 degrees out of phase with the other two step signals; and each step signal has a standard voltage state, an above standard-voltage state, and a below-standard state during each period.

Another aspect of the present invention is: a method for driving a sensorless, brushless DC motor having stator coils, the method comprising: generating a pseudo back-electromotive signal responsive to voltage changes in the stator coils; and commutating current to the stator coils responsive to the pseudo back-electromotive signal.

The method can further include commutating the current to the stator coils before extreme points in the pseudo back-electromotive signal, thereby providing smoother motor rotation. Generating the pseudo back-electromotive signal can include: detecting voltage changes in the stator coils; and comparing the voltage changes.

Yet another aspect of the present invention is a drive circuit for a sensorless, brushless DC motor having stator coils comprising: a control circuit for sensing voltage changes in the stator coils and generating pseudo back-electromotive signal responsive to the voltage changes; an output control circuit coupled to the control circuit for generating drive signals responsive to the pseudo back-electromotive signal; and an output drive circuit coupled to the control circuit for commutating current to the stator coils responsive to the drive signals.

The foregoing and other objects, features and advantages of the invention will become more readily apparent from the following detailed description of a preferred embodiment of the invention which proceeds with reference to the accompanying drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
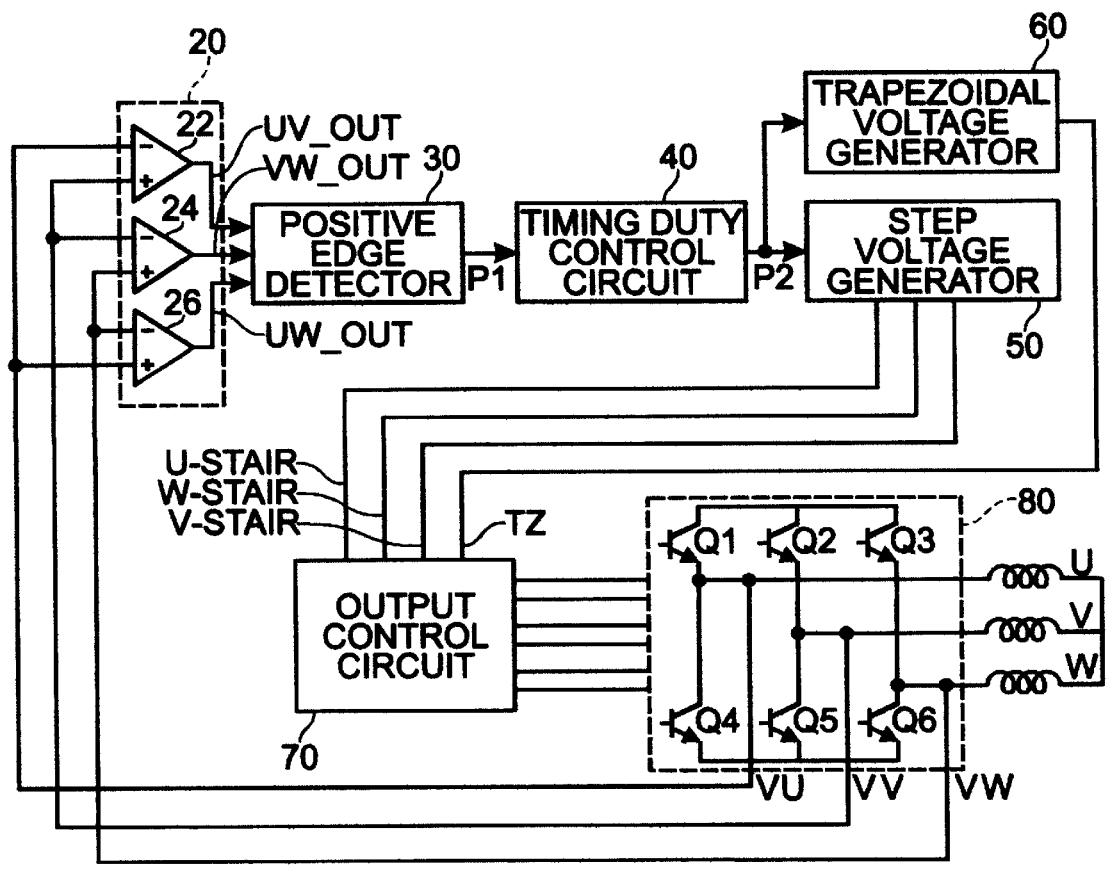
FIG. 2 is a circuit diagram of an embodiment of a drive circuit for a three-phase sensorless brushless DC motor according to the present invention.

FIG. 2 is a circuit diagram of an embodiment of a drive circuit for a three-phase sensorless brushless DC motor according to the present invention. A comparator 20 includes first, second and third comparing devices 22, 24 and 26. The first comparing device 22 compares the voltage VU of the U-coil and the voltage VV of the V-coil and generates a first rectangular voltage difference signal UV_OUT. The second comparing device 24 compares the voltage VV of the V-coil and the voltage VW of the W-coil and generates a second rectangular voltage difference signal VW_OUT. The third comparing device 26 compares the voltage VW of the W-coil and the voltage VU of the U-coil and generates a third rectangular voltage difference signal UW_OUT.

A positive edge detector 30 detects positive edges of the first, second and third rectangular voltage difference signals UV_OUT, VW_OUT and UW_OUT from the first, second, and third comparing devices 22, 24 and 26, respectively, and outputs a first pulse signal P1. Although a positive edge detector has been used in this embodiment, a negative edge detector can also be used for purposes of the present invention.

A timing and duty cycle control circuit 40 generates a second pulse signal P2 by delaying the first pulse signal P1 by thirty (30) degrees and then making on and off times of the first pulse signal P1 substantially equal to each other, i.e., makes the duty cycle of the first pulse signal 50 percent. The on time is the pulse width and the off time is the level state of a the signal during each signal period.

A step voltage generator 50 generates first, second and third step voltage signals U-Stair, V-Stair and W-Stair, in response to the second pulse signal P2. The step voltage signals all have a signal period which is three times that of the second pulse signal P2. Each step voltage signal is at an above-standard voltage for one period from a rising edge of the second pulse signal P2, a standard voltage $V_{ref}$ for a half period of the second pulse signal P2, a below-standard voltage for one period of the second pulse signal P2, and the standard voltage $V_{ref}$ again for a half period of the second pulse signal P2. The three step voltage signals U-Stair, V-Stair and W-Stair are identical to each other except that each is 120 and 240 degrees out of phase with the other two step voltage signals.

A trapezoidal voltage generator 60 receives the second pulse signal P2 and generates a trapezoidal voltage signal which has the same signal period as the second pulse signal P2. The trapezoidal signal swings between voltage that is below the Hall bias voltage to a voltage that is above the Hall bias voltage during each period, preferably from below the Hall bias voltage to above the Hall bias voltage during the on-time of the second pulse signal P2 and then from above the Hall bias voltage to below the Hall bias voltage during the off-time of the second pulse signal P2. The phase of the second pulse signal P2 can be reversed to have the trapezoidal signal TZ swing from below the Hall bias voltage to above the Hall bias voltage during the off-time of the second pulse signal P2.

Figure 3:
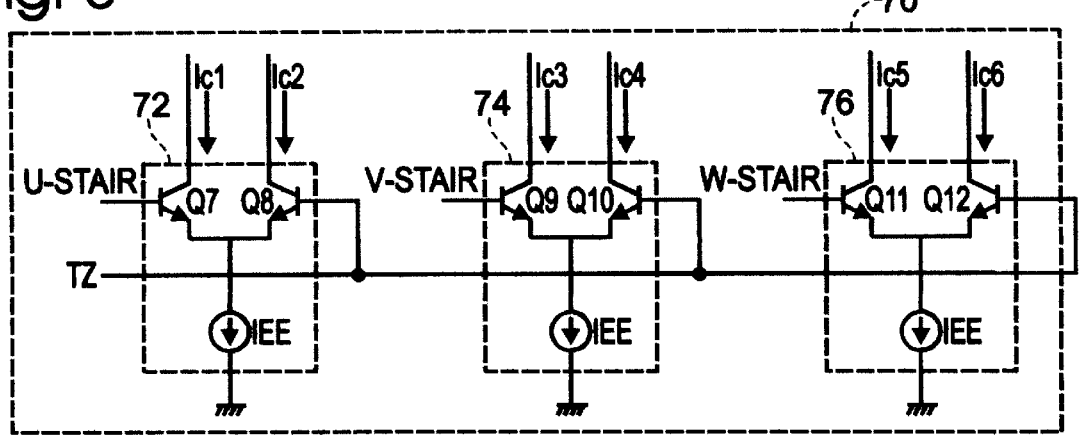
FIG. 3 is a circuit diagram of an embodiment of the output control circuit of FIG. 2.

An output control circuit 70 has first, second and third differential amplifiers 72, 74 and 76 and uses them to generate first and second current outputs Ic1 and Ic2, third and fourth current outputs Ic3 and Ic4, and fifth and sixth current outputs Ic5 and Ic6, respectively, as shown in FIG. 3. Each of the first, second and third differential amplifiers 72, 74 and 76 receive the first, second and third step voltage signals U-Stair, V-Stair and W-Stair, respectively, at one input and the trapezoidal voltage signal TZ at the other input. The differential amplifiers 72, 74 and 76 generate the current outputs Ic1 to Ic6 in response to the voltage difference between their respective inputs.

An output driving circuit 80 has six drive transistors Q1 to Q6 as shown in FIG. 2. The drive transistors Q1 to Q6 are sequentially turned on and off using the current outputs Ic1 to Ic6 as switching signals to perform commutation for driving a motor.

Soft switching of the six drive transistors Q1 to Q6 of the output drive circuit 80 is possible only when the current outputs Ic1 to Ic6, which are used as switching signals of the driving transistors Q1 to Q6, are increased or decreased linearly. Generally, the current outputs of a differential amplifier increase or decrease linearly when the voltage difference between its two inputs is within ±50 mV of the Hall bias voltage, i.e., within four times the thermal voltage of the Hall bias voltage ($4V_T$=100 mV). In other words, soft switching of the six drive transistors Q1 to Q6 is possible when the voltage difference between the step voltage signals and trapezoidal voltage signal is within ±50 mV of the Hall bias.

A motor drive circuit constructed in accordance with the present invention is designed to begin commutation sixty (60) degrees before the maximum and minimum points of the back-electromotive force rather than the maximum and minimum points of the back-electromotive force as in the conventional technique. The positive edge detector 30 delays the first pulse signal P1 by thirty (30) degrees in order to ensure that the voltage differences between the step voltage signals and the trapezoidal voltage signal that are to the differential amplifiers 72, 74 and 76 are within ±50 mV of the Hall bias during this new commutation interval.

Figure 1:
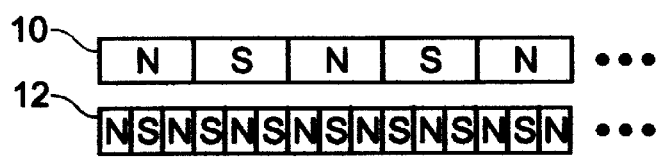
FIG. 1 is a diagram of rotor magnets on a brushless DC motor.
Figure 4:
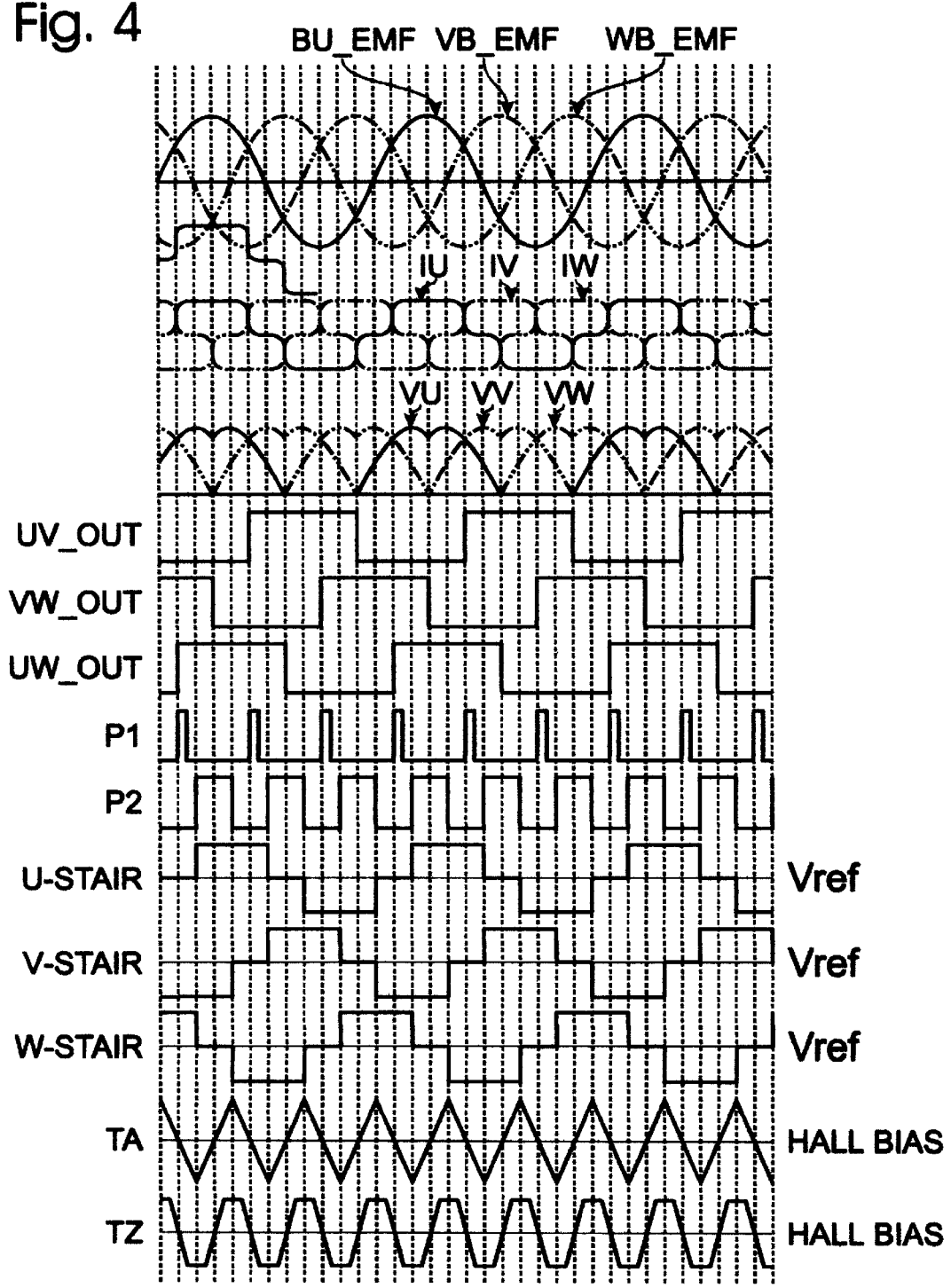
FIG. 4 is a timing diagram illustrating timing signals of the drive circuit of FIG. 2.

FIG. 4 is a timing diagram illustrating timing signals of the sensorless three-phase brushless DC motor driving circuit of FIG. 2, wherein commutation is performed in reference to minimum points of the back-electromotive force signals. It should be noted that commutation could be performed in reference to maximum points of the back-electromotive force signals for purposes of the present invention. Referring again to FIG. 4, the first pulse signal P1, which is generated by comparing the voltages VU, VV and VW of the stator coils, is at a high level when the back-electromotive force signals UB-EMF, VB-EMF and WB-EMF are at minimum values. These are the times when a magnetic pole boundary of the permanent magnet is aligned with the center of a stator coil.

However, the sensorless three-phase brushless DC motor driving circuit of FIG. 2 is designed to begin commutation at sixty (60) degrees before the minimum points of the back-electromotive signals. The step voltage signals U-Stair, V-Stair and W-Stair and the trapezoidal signals TZ are generated so as to allow soft switching at this new interval. The differential amplifiers 72, 74 and 76 of the output control circuit 70 are driven by the voltage differences between the step voltage signals U-Stair, V-Stair and W-Stair and the trapezoidal signal TZ.

By using the voltage differences between the step voltage signals and the trapezoidal signal, it is possible to perform commutation within ±50 mV of the Hall bias, i.e., during the interval immediately before and after the trapezoidal signal TZ crosses the Hall bias. There are two such intervals in each period of the trapezoidal signal TZ. If commutation is performed at these moments, the coil currents IU, IV and IW in the stator increase or decrease linearly.

In the embodiment described above, the trapezoidal signal TZ is used as an input to the differential amplifiers 72, 74 and 76. However, it is possible to use any signal which increases linearly from below-Hall bias to above-Hall bias and decrease linearly from above-Hall bias to below-Hall bias. For example, a triangular signal TA, which increases linearly from below-Hall bias to above-Hall bias during the on-time of the second pulse signal and decreases linearly from above-Hall bias to below-Hall bias during the off-time of the second pulse signal, can be used in place of the trapezoidal signal TZ.

A sensorless three-phase brushless DC motor drive circuit constructed according to the present invention allows soft switching of motor drive transistors so the system size and manufacturing costs can be reduced since a Hall sensor is not required. A drive circuit constructed in accordance with the present invention also provides reliable motor drive characteristics.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A drive circuit for a sensorless three-phase brushless DC motor, comprising:

a comparator for comparing the voltages of stator coils during motor rotation and generating a rectangular difference signal;

an edge detector coupled to the comparator for detecting edges of the rectangular difference signal and generating a first pulse signal;

a timing circuit coupled to the edge detector for generating a second pulse signal responsive to the first pulse signal;

a step signal generator coupled to the timing control circuit for generating first, second and third step signals responsive to the second pulse signal;

a control signal generator coupled to the timing control circuit for generating a control signal responsive to the second pulse signal; and a commutator coupled to the step signal generator and control signal generator for commutating the currents flowing in the stator coils responsive to the differences between the control signal and each of the step signals.

2. A drive circuit according to claim 1 wherein the timing circuit generates the second pulse signal by delaying the first pulse signal.

3. A drive circuit according to claim 1 wherein the timing circuit generates the second pulse signal such that the on-time and off-time of the second pulse signal are equal.

4. A drive circuit according to claim 1 wherein the step signal generator generates the step signals such that each step signal:

has a signal period that is three times the period of the second pulse signal;

is 120 and 240 degrees out of phase with the other two step signals; and has a standard voltage state, an above standard-voltage state, and a below-standard state in each period.

5. A drive circuit according to claim 1 wherein the control signal generator generates the control signal such that the control signal swings between an above-Hall bias voltage and a below-Hall bias voltage during each period of the second pulse signal.

6. A drive circuit according to claim 1 wherein the control voltage signal linearly increases from a below-Hall bias voltage to an above-Hall bias voltage during the on-time of the second pulse signal and linearly decreases from an above Hall bias voltage to a below-Hall bias voltage during the off-time of the second pulse signal.

7. A drive circuit according to clam 6 wherein the control signal is a trapezoidal voltage signal.

8. A drive circuit according to claim 1 wherein each of the step signals maintains an above-standard voltage level for a first period of the second pulse signal, a standard voltage level for a next half period of the second pulse signal, a below-standard voltage level for the next period of the second pulse signal, and standard voltage level for the next half period of the second pulse signal.

9. A drive circuit according to claim 1 wherein the commutator comprises three differential amplifiers, each amplifier coupled to receive the control signal and one of the step signals.

10. A drive circuit for a sensorless three-phase brushless DC motor, comprising:

a comparator for comparing the voltages of stator coils during motor rotation and generating a rectangular difference signal;

an edge detector coupled to the comparator for detecting edges of the rectangular difference signal and generating a first pulse signal;

a timing circuit coupled to the edge detector for generating a second pulse signal responsive to the first pulse signal;

a signal generator coupled to the timing control circuit for generating first, second and third step signals and a control signal responsive to the second pulse signal; and a commutator coupled to the signal generator for commutating the currents flowing in the stator coils responsive to the differences between the control signal and each of the step signals.

11. A method for driving a sensorless three-phase brushless DC motor, the method comprising:

generating a rectangular difference signal by comparing the voltages of stator coils during motor rotation;

generating a first pulse signal responsive to edges of the rectangular difference signal;

generating a second pulse signal by delaying the first pulse signal;

generating first, second and third step signals responsive to the second pulse signal;

generating a control signal responsive to the second pulse signal; and commutating currents flowing in the stator coils responsive to the difference between the control signal and each of the step signals.

12. A method according to claim 11 wherein:

the duty cycle of the second pulse signal is 50 percent;

the control signal swings between an above-Hall bias voltage and a below-Hall bias voltage during each period of the second pulse signal;

each step signal has a signal period which is three times the period of the second pulse signal;

each step signal is 120 and 240 degrees out of phase with the other two step signals; and each step signal has a standard voltage state, an above standard-voltage state, and a below-standard state during each period.

13. A method for driving a sensorless, brushless DC motor having stator coils, the method comprising:

detecting voltage changes in the stator coils;
    commutating current to the stator coils responsive to the voltage changes such that the current to the stator coils is commutated before extreme points of a back-electromotive force of the motor.

14. A method according to claim 13 further including:

generating a step signal responsive to the voltage changes;

generating a sloping signal responsive to the voltage changes; and combining the step signal and the sloping signal with a differential amplifier;

wherein the difference between the step signal and the sloping signal is low enough to cause the output of the differential amplifier to change linearly, thereby providing soft switching of switches for commutating the current to the stator coils.

15. A method according to claim 13 wherein the current to the stator coils is commutated about 60 degrees before a maximum or minimum point of the back-electromotive force.

16. A drive circuit for a sensorless, brushless DC motor having stator coils comprising:

a control circuit for sensing voltage changes in the stator coils;

an output control circuit coupled to the control circuit for generating drive signals responsive to the voltage changes; and an output drive circuit coupled to the control circuit for commutating current to the stator coils responsive to the drive signals;

wherein the control circuit causes the output drive circuit to commutate the current to the stator coils before extreme points in a back-electromotive force of the motor.

17. A drive circuit according to claim 16 wherein the control circuit includes a comparator circuit for comparing the voltage changes in the stator coils.

18. A drive circuit according to claim 16 wherein:

the output drive circuit includes switches for commutating the current to the stator coils; and the output control circuit generates drive signals that change linearly, thereby providing soft switching of the switches.

19. A drive circuit according to claim 16 wherein the control circuit is constructed to commutate the current to the stator coils about 60 degrees before a maximum or minimum point of the back-electromotive force.

* * * * *